United States Patent
Krah

(10) Patent No.: US 10,498,200 B2
(45) Date of Patent: Dec. 3, 2019

(54) DRIVE DEVICE

(71) Applicant: BECKHOFF AUTOMATION GMBH, Verl (DE)

(72) Inventor: Jens Onno Krah, Wuppertal (DE)

(73) Assignee: Beckhoff Automation GmbH, Verl (DE)

( * ) Notice: Subject to any disclaimer, the term of this patent is extended or adjusted under 35 U.S.C. 154(b) by 338 days.

(21) Appl. No.: 15/459,949

(22) Filed: Mar. 15, 2017

(65) Prior Publication Data

US 2017/0187267 A1 Jun. 29, 2017

Related U.S. Application Data

(63) Continuation of application No. PCT/EP2015/072116, filed on Sep. 25, 2015.

(30) Foreign Application Priority Data

Sep. 29, 2014 (DE) .......................... 10 2014 114 129

(51) Int. Cl.
*H02K 11/33* (2016.01)
*H02K 11/21* (2016.01)
*H02K 9/22* (2006.01)

(52) U.S. Cl.
CPC ............... *H02K 11/33* (2016.01); *H02K 9/22* (2013.01); *H02K 11/21* (2016.01)

(58) Field of Classification Search
CPC ...... H02K 11/33; H02K 9/22; H02K 11/0094; H02K 11/21; H02K 11/215; H02K 11/225; H02K 5/225

USPC .......................................................... 310/52
See application file for complete search history.

(56) References Cited

U.S. PATENT DOCUMENTS

| | | | |
|---|---|---|---|
| 3,508,327 A * | 4/1970 | Pieper | H02K 15/16 29/419.2 |
| 6,034,465 A * | 3/2000 | McKee | F04D 13/0666 310/156.23 |
| 6,441,353 B1 | 8/2002 | Gehrmann et al. | |

(Continued)

FOREIGN PATENT DOCUMENTS

| | | |
|---|---|---|
| CN | 101159396 A | 4/2008 |
| CN | 102356246 A | 2/2012 |

(Continued)

OTHER PUBLICATIONS

Translation of foreign document DE 102005037488 (Year: 2006).*

(Continued)

*Primary Examiner* — Alex W Mok
(74) *Attorney, Agent, or Firm* — Dorsey & Whitney LLP

(57) ABSTRACT

A drive device comprises an electric motor, a first receiving area and a second receiving area. The first receiving area may include converter power electronics. The second receiving area may include further electronics. The first and second receiving areas may be formed on the B-side of the electric motor. The first and second receiving areas may be thermally decoupled from one another by a thermal isolation, such that during the operation of the electric motor a first temperature zone can be formed in the first receiving area and a second temperature zone can be formed in the second receiving area.

18 Claims, 14 Drawing Sheets

(56) References Cited

U.S. PATENT DOCUMENTS

| | | | | |
|---|---|---|---|---|
| 6,949,849 B1* | 9/2005 | Wright | ............... | H02K 11/33 |
| | | | | 310/64 |
| 7,911,093 B2* | 3/2011 | Schueren | ............ | H02K 5/225 |
| | | | | 310/68 R |
| 2006/0125240 A1* | 6/2006 | Kato | .................. | F02N 11/04 |
| | | | | 290/31 |
| 2010/0141065 A1* | 6/2010 | El Baraka | ............ | H02K 3/38 |
| | | | | 310/71 |
| 2012/0126728 A1* | 5/2012 | El-Refaie | ........... | H02K 11/33 |
| | | | | 318/139 |
| 2013/0108485 A1* | 5/2013 | Suitou | ................ | F04B 27/14 |
| | | | | 417/410.1 |
| 2013/0270942 A1* | 10/2013 | Riehl | ................. | H02K 5/128 |
| | | | | 310/71 |

FOREIGN PATENT DOCUMENTS

| | | | | |
|---|---|---|---|---|
| DE | 19622396 A1 | 12/1997 | | |
| DE | 102005037488 A1 | 3/2006 | | |
| DE | 102006047269 A1 | 4/2008 | | |
| EP | 2088663 A2 * | 8/2009 | ............ | H02K 5/15 |
| EP | 2238817 B1 | 6/2011 | | |
| EP | 2479875 A2 * | 7/2012 | ............ | H02K 5/20 |
| FR | 2903246 A1 | 1/2008 | | |
| JP | 2010178465 A | 8/2010 | | |

OTHER PUBLICATIONS

Translation of foreign document DE 102006047269 (Year: 2008).*
First Office Action for Chinese Patent Application No. 201580052746.
X, dated Sep. 25, 2018, with English translation (6 pages).

\* cited by examiner

DRIVE DEVICE

CROSS-REFERENCE TO RELATED APPLICATIONS

This patent application claims priority to international application PCT/EP2015/072116, filed Sep. 25, 2015, and German patent application DE 102014 114 129.6, filed Sep. 29, 2014, entitled MODULARER MOOTORANBAUUM-RICHTER, each of which is hereby incorporated by reference herein, in the entirety and for all purposes.

FIELD

This invention relates to a drive device.

BACKGROUND

The published patent application DE 10 2006 047 269 A1 discloses a converter motor. The published patent application DE 196 22 396 A1 discloses a frequency converter for a drive device. The patent specification U.S. Pat. No. 6,441,353 B1 discloses a drive unit.

Drive devices as such are known from the prior art. In this regard, by way of example, the patent specification EP 2238817 B1 discloses a converter motor comprising a motor and a converter. The converter is fixed to a B-side of the motor, wherein the converter is thermally decoupled from the motor. Power electronics and signal electronics are arranged in the converter. The power electronics are thermally connected to a heat sink. The signal electronics are thermally connected to a housing wall of a converter housing.

In general it is the case that power electronics become hotter than other electronics of a converter. There is therefore a need for an efficient cooling concept. This is because usually it is the case that the individual electronic components of the power electronics and of the further electronics of converter electronics cannot all cope with the same temperature. Some components are more temperature-resistant than others.

Motor windings—in particular the isolation—are often temperature-resistant up to 140° C. Electronic components are often significantly less temperature-resistant. That has the effect, for example, that motors having an electromechanical resolver as angle measuring system are permitted to attain a higher operating temperature than motors having an encoder as measuring system. The lower thermal stability of encoder motors automatically leads to a lower rated current of the motor that is to say to a lower rated torque. This downgrading on account of the electronics is called derating. Converter motors hitherto have had significant derating.

SUMMARY

An object of the present invention is to provide an improved drive device which provides an efficient cooling concept, such that electronic components having different temperature sensitivities can be used during the operation of the drive device, without the components incurring damage as a result of the temperatures prevailing during operation.

EXAMPLES

According to one aspect of the examples and embodiments described herein, a drive device is provided, comprising: an electric motor. A first receiving area may include converter power electronics. A second receiving area may include further electronics. The first and second receiving areas are formed on the B-side of the electric motor. The first and second receiving areas are thermally decoupled from one another by means of a thermal isolation or using a similar thermally isolating member or structure, such that during the operation of the electric motor a first temperature zone can be formed in the first receiving area and a second temperature zone can be formed in the second receiving area.

In various examples and embodiments, the concepts described herein can provide two receiving areas on the B-side of the electric motor, said receiving areas being thermally decoupled from one another by means of a thermal isolation or using a similar thermally isolating member or structure. Waste heat is generated as a result of the operation of the electric motor and leads to a temperature increase at the B-side of the electric motor. However, since the two receiving areas are thermally decoupled from one another, different temperatures prevail in the corresponding temperature zones, such that, advantageously, electronic components can be arranged in the corresponding temperature zones, that is to say in the corresponding receiving areas, depending on their thermal stability or their temperature sensitivity and on their cooling requirement (heat usually has to be dissipated from power transistors). In this regard, therefore, the components having an increased thermal stability can be arranged in the temperature zone in which a higher temperature prevails compared with the other temperature zone. The components which can only cope with lower temperatures can then be arranged in the other temperature zone. As a result, advantageously, an efficient cooling concept is thus provided.

In some embodiments, the B-side of the electric motor denotes that side of the electric motor which is situated opposite the A-side of the electric motor. The A-side denotes that side of the electric motor at which a motor shaft of the electric motor provides an output drive.

According to one embodiment it is provided that the first receiving area is formed by means of a bearing shield of the electric motor or using a similar bearing shield member or structure. This affords the technical advantage, in particular, that an already present bearing shield of the electric motor can be efficiently utilized.

In another embodiment it is provided that a fixing unit for power transistors of the converter power electronics is arranged, in particular arranged releasably, in the first receiving area. Depending on example, this may afford the technical advantage, in particular, that with the releasable arrangement the fixing unit with the power transistors can be simply exchanged in the case of a fault or in the case of a failure of the power transistors. Generally, the fixing unit affords the technical advantage that power transistors can be fixed securely in the first receiving area.

In one embodiment it is provided that the fixing unit is configured to releasably fix power transistors. This affords the technical advantage, in particular, that the power transistors can be simply removed from the fixing unit in the case of a fault or in the case of a failure.

In accordance with a further embodiment it is provided that the fixing unit comprises at least one plate with at least one spring clamp fixed on the plate and serving for fixedly clamping a power transistor. This affords the technical advantage, in particular, that the power transistors can be simply inserted or removed, without an additional tool being required therefor.

In accordance with a further embodiment it is provided that a heat shield having a section projecting into the first receiving area is formed, wherein the heat shield is thermally decoupled from the first receiving area by means of the thermal isolation, wherein the projecting section comprises a third receiving area for a position sensor.

Depending on example, this may afford the technical advantage, in particular, that a space in the first receiving area can be utilized even for components which are not specified for the temperature in the first temperature zone during the operation of the electric motor. This is because the heat shield brings about a shielding of the heat radiation resulting from the temperature prevailing in the first temperature zone. The heat shield, here in particular the projecting section, acts as a shield against the heat radiation or thermal radiation and also against heat flow caused by convection, by virtue of said heat flow being dissipated toward the outside by means of the heat shield or using a similar heat shield member or structure, such that the electronic components in the third receiving area do not heat up.

In accordance with a further embodiment it is provided that the heat shield is thermally coupled to the second receiving area, such that the second temperature zone can be lengthened into the first receiving area.

The temperature present in the second temperature zone may at least partly also be present in the third receiving area on account of the thermal coupling; at least a temperature gradient from the temperature of the second temperature zone to the temperature of the first temperature zone will form, such that a temperature which is significantly closer to the temperature of the second receiving area than to the temperature of the first receiving area generally prevails in the third receiving area.

In another embodiment it is provided that the heat shield comprises a metal sheet having a flanged tube as projecting section. This affords the technical advantage, in particular, that the position sensor can be received efficiently and simply in the tube. A simple fixing of the heat shield to other components is advantageously made possible via the metal sheet. On account of its thin configuration a metal sheet advantageously does not take up much space and also does not have as much mass in comparison with a heat shield which comprises thicker elements rather than a metal sheet. Advantageously, a weight saving is thus brought about.

In accordance with another embodiment it is provided that the first receiving area is thermally coupled to the electric motor. This affords the technical advantage, in particular, that the second receiving area is thermally decoupled from the electric motor on account of the thermal isolation, such that the temperature in the second temperature zone will be lower than the temperature in the first temperature zone during the operation of the electric motor. Electronic components that are temperature-sensitive can thus be arranged in the second receiving area. Consequently, electronic components that are more thermally stable and in this respect are specified for higher temperatures, for example temperatures such as occur during the operation of the electric motor, can be arranged in the first receiving area.

According to another embodiment it is provided that the first receiving area comprises a self-contained frame. This affords the technical advantage, in particular, that a stable means for fixing the power transistors is provided. This is because a frame is generally a stable fixing means. In particular, it is provided that the power transistors are fixed at opposite inner sides of the frame. The inner sides because the outer sides of the frame opposite the inner sides afford protection for the power transistors.

In another embodiment it is provided that the first receiving area comprises a baseplate, on which the frame is arranged as heat sink. This affords the technical advantage, in particular, that the frame forms a heat sink for reducing the temperature in the first temperature zone. The baseplate receives the power transistors, in particular. That is to say, therefore, that according to one embodiment the power transistors are fixed to the baseplate.

In accordance with another embodiment it is provided that the isolation comprises a self-contained plastic frame, which is fixed to the frame in a force-locking and/or positively locking manner. This affords the technical advantage, in particular, that a good thermal isolator, here the plastic, is provided. The frame is a stable form that is simple to produce, such that production of the plastic frame is possible in a simple manner. Force-locking engagement and/or positively locking engagement are generally good fixing possibilities, such that a reliable fixing of the plastic frame to the frame is effected. According to one embodiment, the force-locking and/or positively locking fixing is a releasable force-locking and/or releasable positively locking connection or fixing.

In accordance with a further embodiment it is provided that silicon carbide MOSFETs are arranged as converter power electronics in the first receiving area. SiC MOSFETs are distinguished by very low losses and a particularly high thermal stability (200° C.). Consequently, complex and large and heavy heat sinks can be dispensed with in the case of use of SiC MOSFETs as power transistors for a converter. In particular, a fan can be dispensed with.

Furthermore, SiC MOSFETs have particularly advantageous properties: in the case of SiC MOSFETs, advantageously, the MOSFET body diode always present may be utilized as a freewheeling diode having a very short reverse recovery time in the SiC MOSFETs. This can advantageously reduce switching losses.

Furthermore, a channel of the SiC MOSFET in the on state can carry the current in both directions (a so-called synchronous rectifier). This can reduce the voltage drop across the freewheeling diode and thus the on-state losses.

In contrast to known IGBTs, silicon carbide MOSFETs do not necessarily have the IGBT-typical tail current upon turn-off. This, too, can reduce switching losses.

According to one embodiment, a position sensor, in particular an encoder or resolver, is provided, which is arranged in particular in the projecting section of the heat shield. In general, an encoder may be less resistant to heat than a resolver, such that the provision of a heat shield for an encoder is technically particularly expedient and advantageous.

In accordance with a further embodiment it is provided that the converter power electronics, in particular the converter power transistors (preferably six converter power transistors), are arranged in the first receiving area.

According to a further embodiment it is provided that further electronics of a converter, which are different than converter power electronics, are arranged in the second receiving area. In particular, one or more electronic components that emit less power loss than the converter power electronics is/are arranged in the second receiving area. The further electronics comprise for example control electronics (for example: a processor and/or a programmable logic, for example FPGA "Field Programmable Gate Array"; referred to as: (application) field programmable (logic) gate array) for the position sensor, for example, and/or for the electric motor and/or signal electronics for the position sensor, for example, and/or for the electric motor.

That is to say, therefore, that according to one embodiment the drive device comprises a converter arranged on the B-side of the electric motor, wherein the converter power electronics, in particular the converter power transistors (preferably six converter power transistors), are arranged in the first receiving area, wherein the further electronics of the converter, which are different than the converter power electronics, are arranged in the second receiving area.

According to some embodiments, the drive device is part of an automation system. According to one embodiment, the drive device is part of a robot, in particular of a robot of an automation system. According to further embodiments, it can be provided that the second receiving area comprises a housing or is formed as such. The housing is or comprises a metal cap, for example.

BRIEF DESCRIPTION OF THE DRAWINGS

The invention is explained in more and greater detail below on the basis of preferred exemplary embodiments and with reference to figures, in which a schematic illustration is provided in each case.

Hereinafter, identical reference signs may be used for similar or identical features.

DETAILED DESCRIPTION

FIGS. 1 to 5 show in each case a point in time during assembly of a drive device. Here in each case the lower drawing in the figures shows a plan view. The upper drawing in the figures shows a sectional side view along the broken line A-A' in accordance with the plan view.

Figure 1:
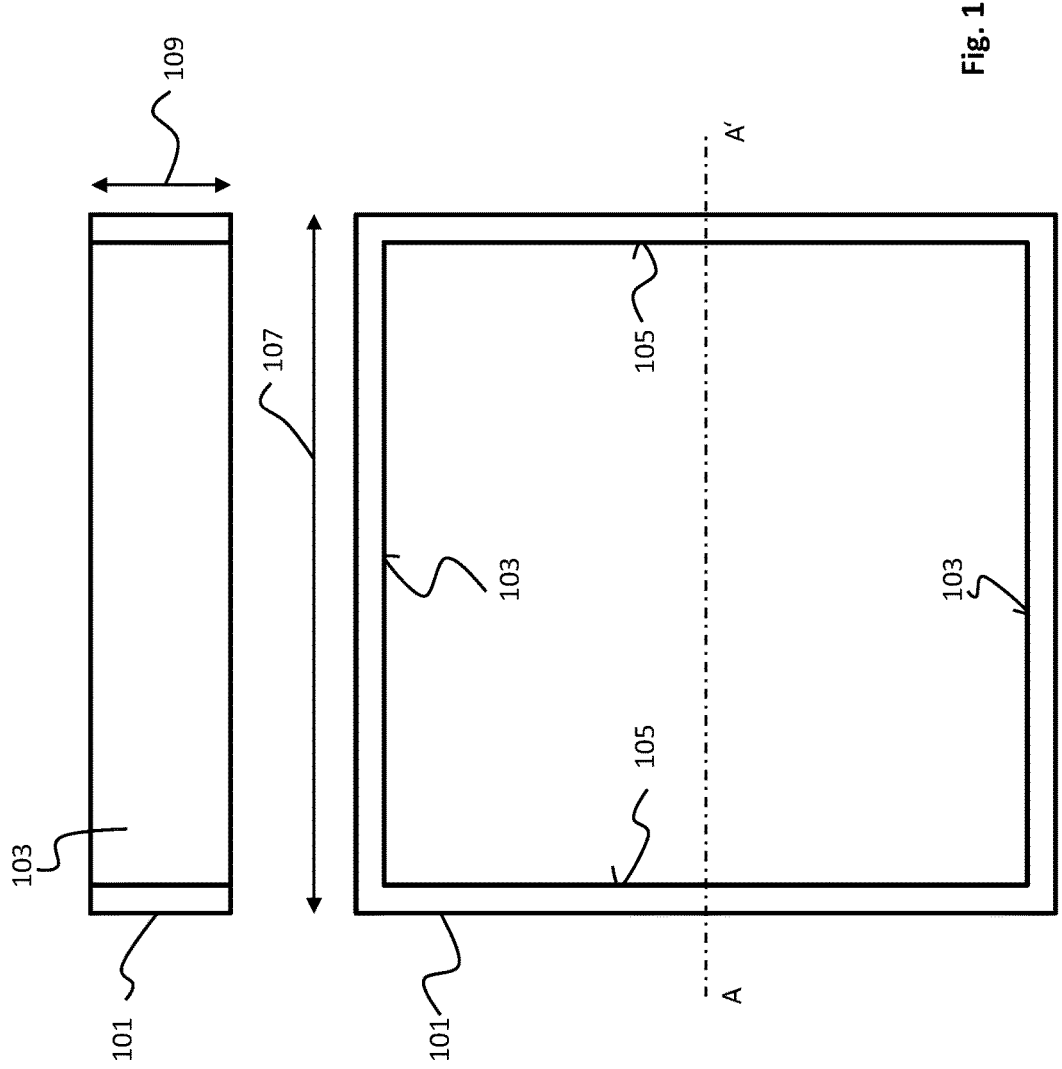
FIGS. 1-5 show in each case different points in time during the assembly of a drive device.

FIG. 1 shows a frame 101, which is formed from aluminum, for example. The frame 101 is a quadrilateral frame and self-contained. By way of example, the frame 101 has a square shape. Respectively opposite inner sides 103 and 105 are formed on account of the self-contained design of the frame 101. A height of the frame is illustrated symbolically by a double-headed arrow having the reference sign 109. The height is 20 mm, for example. A width of the frame is illustrated symbolically by a double-headed arrow having the reference sign 107. A width of the frame 101 is 100 mm, for example.

Figure 2:
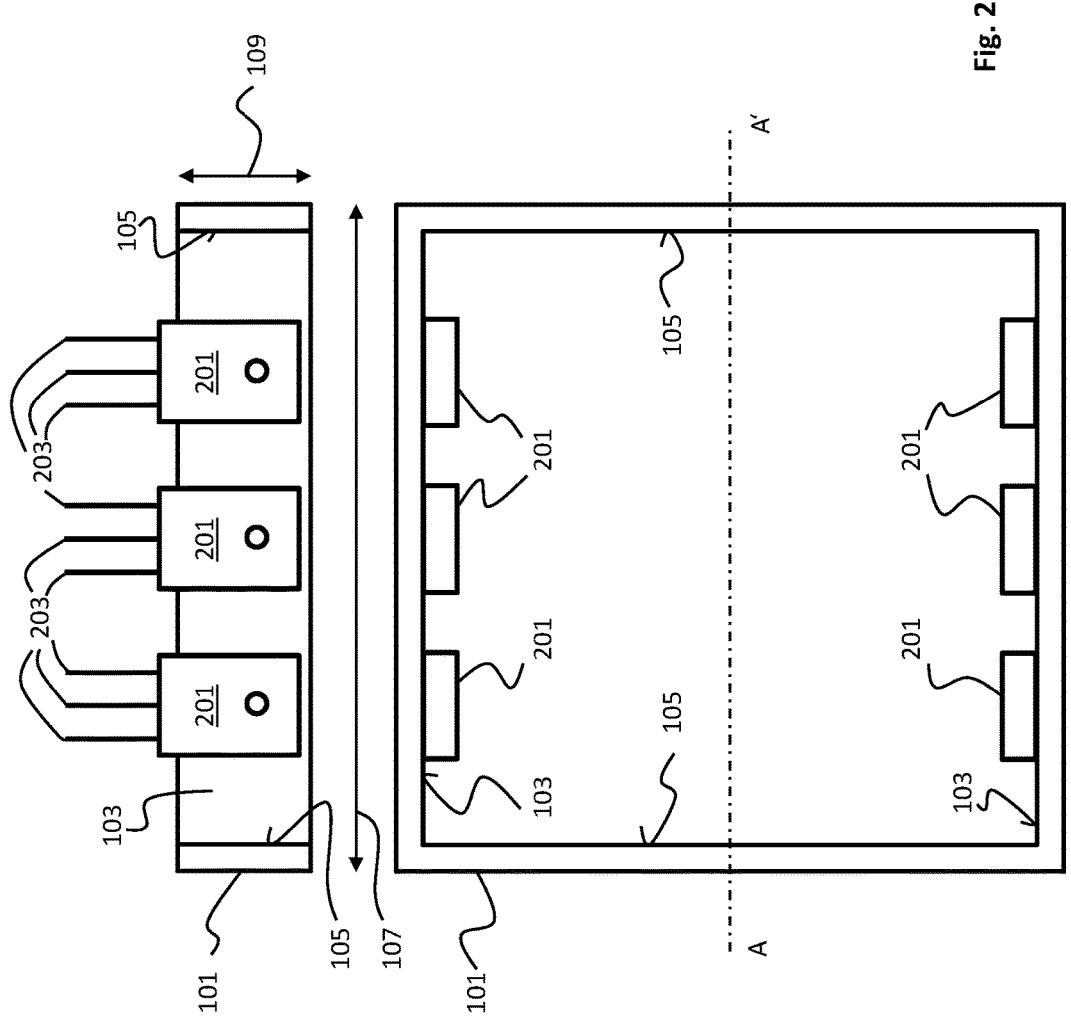

FIG. 2 shows the frame 101, wherein in each case three power transistors 201 of converter power electronics are arranged at two opposite inner sides 103 of the frame 101. The six power transistors 201 are silicon carbide MOSFETs, for example. That is to say, therefore, that three power transistors 201 are arranged at an inner side 103. Therefore, a total of six power transistors 201 are thus fixed to the frame 101. The reference sign 203 denotes three electrical connection pins of a power transistor 201.

The use of silicon carbide MOSFETs affords the technical advantage, in particular, that they are specified for a temperature of up to 200° C., without being damaged. Here, in general, the depletion layer of the SiC MOSFETs is specified for temperatures of up to 200° C. This predestines these power transistors 201 for use in the vicinity of an electric motor. Therefore, it is particularly advantageous to use such power transistors for converter power electronics of a converter. This is provided according to examples of the invention, e.g., according to one embodiment.

Figure 3:
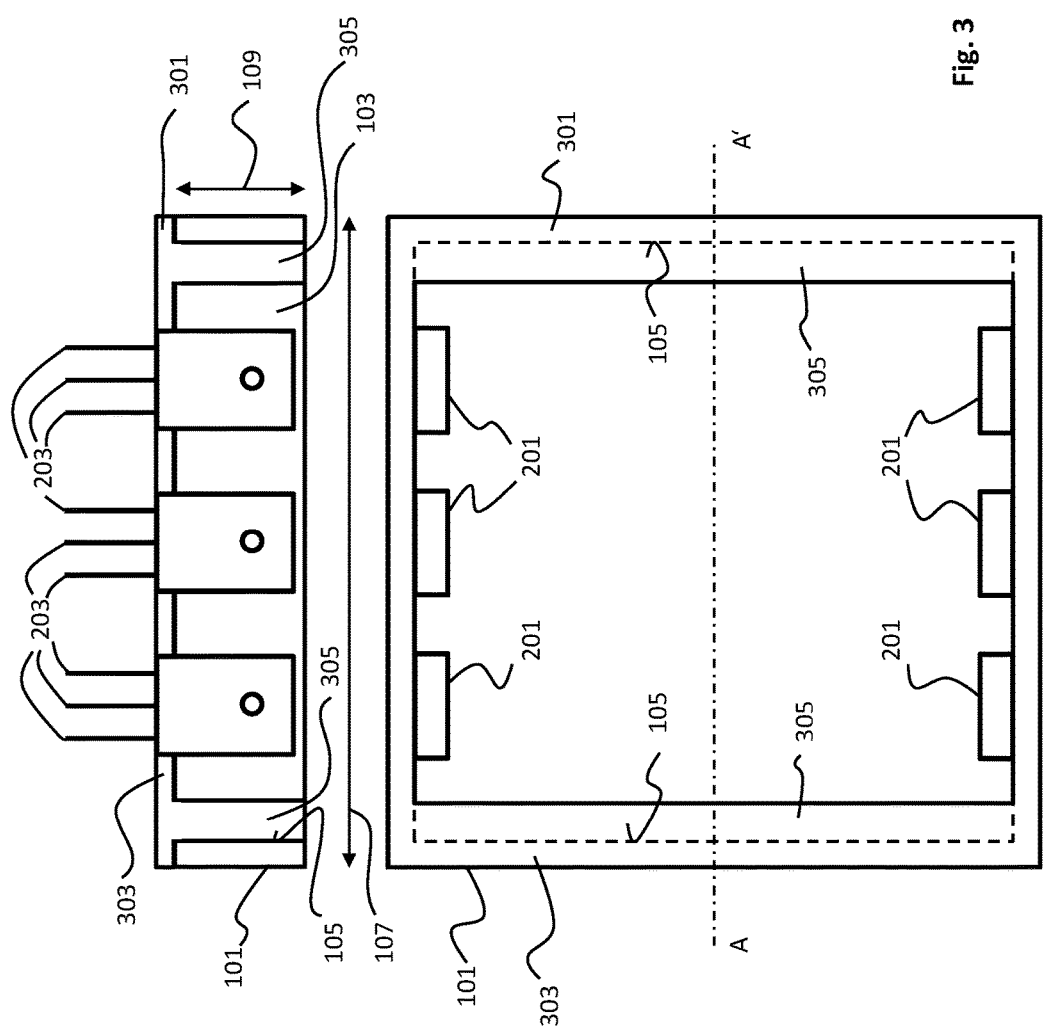

FIG. 3 shows the arrangement in accordance with FIG. 2 with a plastic frame 301, which acts as a thermal isolation. That is to say that the plastic frame 301 is a thermal isolation. The plastic frame 301 comprises a base section 303, from which limbs 305 protrude perpendicularly. The plastic frame 301 is placed by its base face 303 or its base section 303 onto the frame 101. The plastic frame 301 is dimensioned and formed in such a way that the limbs 305 bear against opposite inner walls 105 of the frame 101, such that a positively locking fixing of the frame 101 with the plastic frame 301 is effected.

Figure 4:
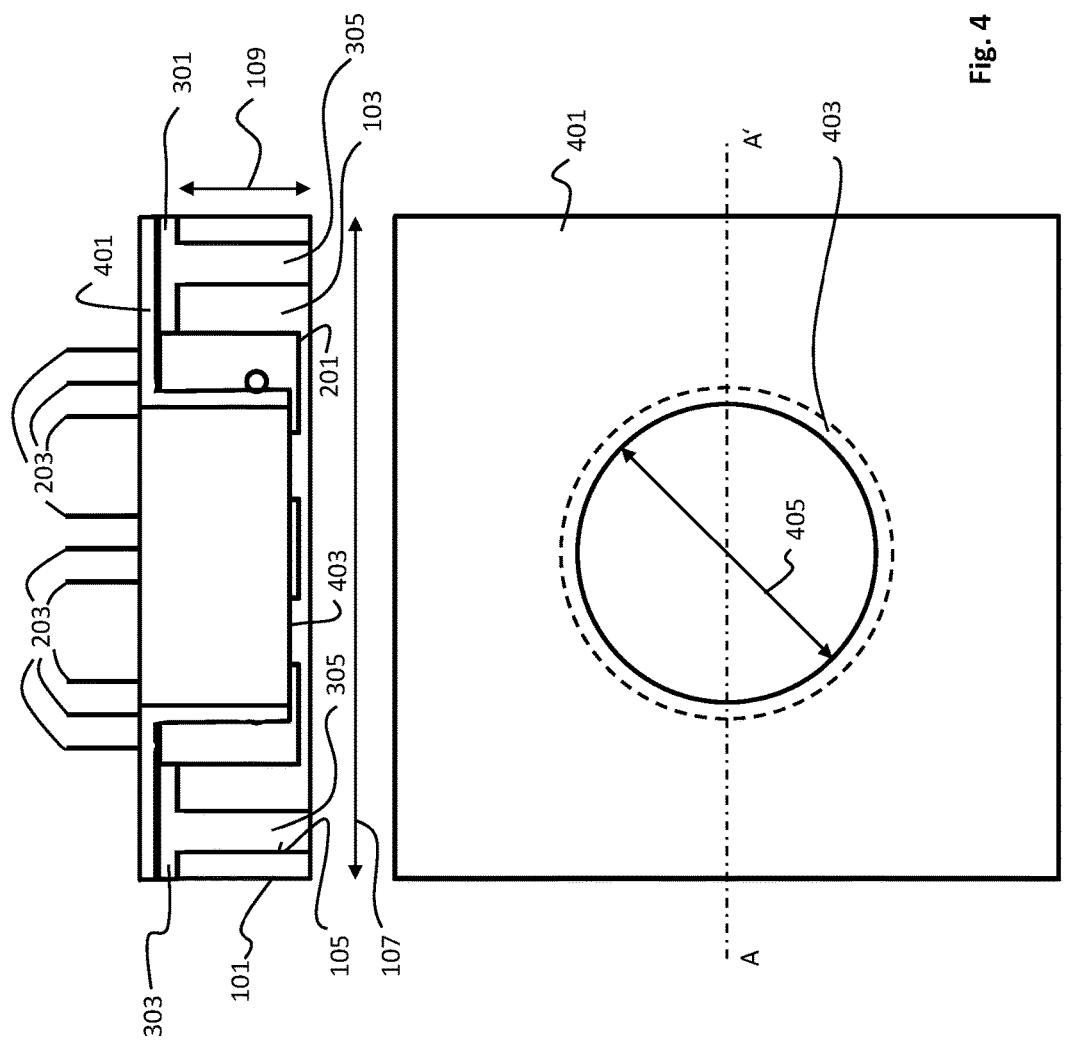

FIG. 4 shows the arrangement in accordance with FIG. 3 with a metal sheet 401. The metal sheet 401 has a shape adapted to the frame 101, wherein a tube 403 is flanged centrally in the metal sheet 401. Said tube 403 protrudes perpendicularly from the metal sheet 401. The metal sheet 401 and also the tube 403 are formed from aluminum, for example. A thickness of the metal sheet 401 is 2 mm, for example. The metal sheet 401 is placed onto the plastic frame 301, more precisely onto the base face 303, such that the tube 403 projects into the frame 101, more precisely into the space surrounded or framed by the frame 101.

The reference sign 405 denotes a double-headed arrow that symbolically illustrates a diameter of the tube 403. In this case, the diameter 405 is adapted to customary dimensions and sizes of an encoder 501 (cf. FIG. 5).

Figure 5:
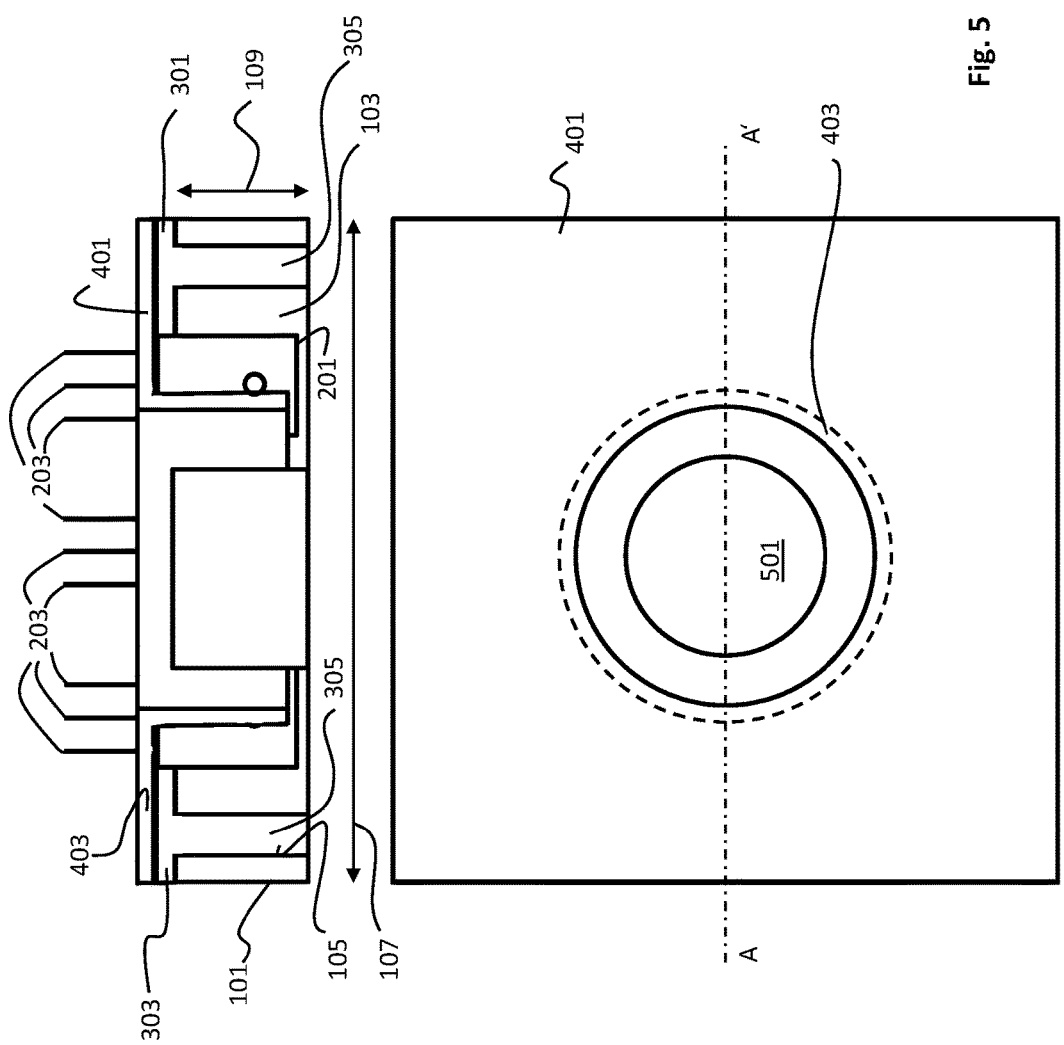

FIG. 5 shows the arrangement in accordance with FIG. 4, wherein an encoder 501 as a position sensor for a motor shaft of an electric motor is arranged in the tube 403.

Figure 6:
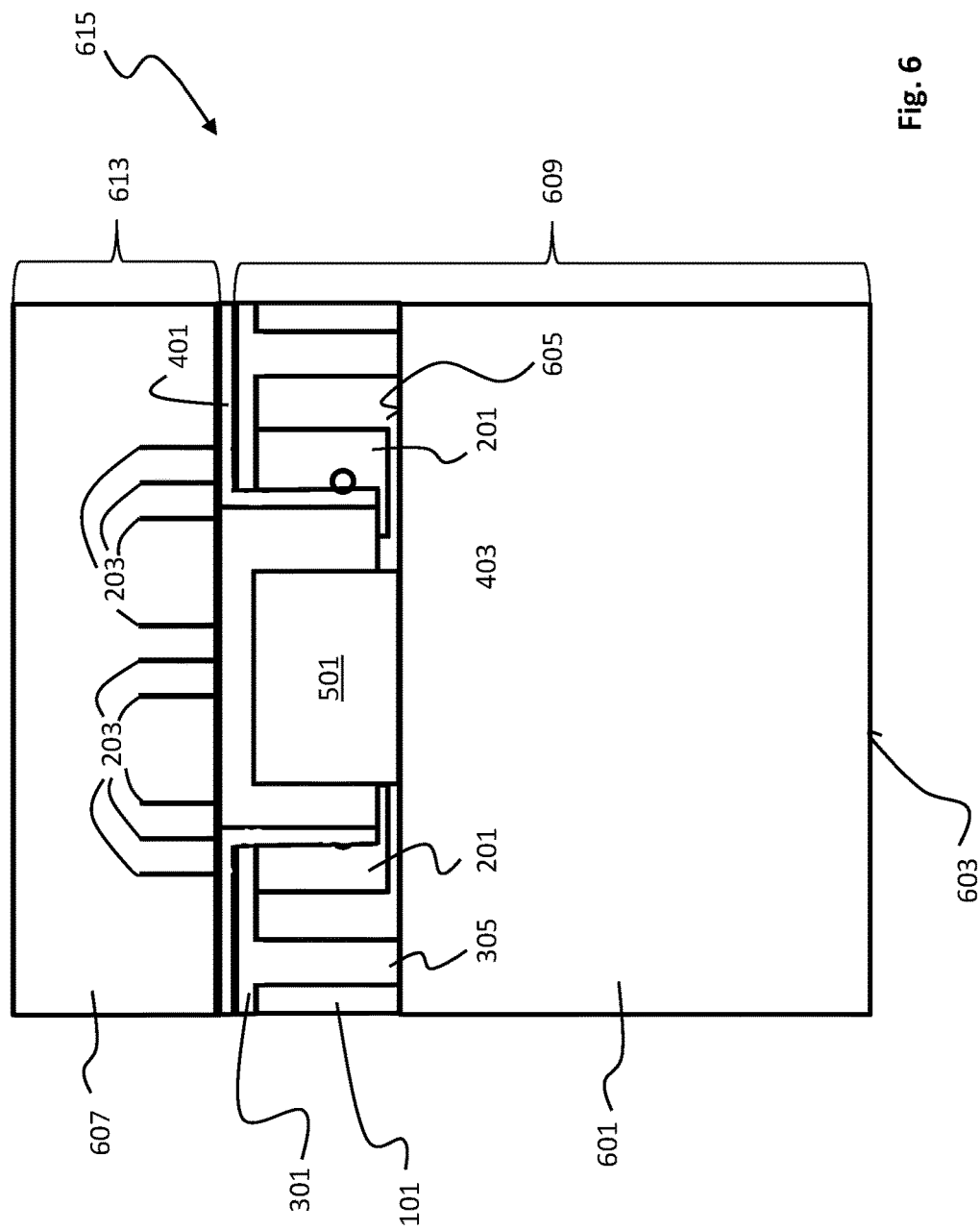
FIG. 6 shows a drive device.

FIG. 6 shows the arrangement in accordance with FIG. 5 with an electric motor 601. The electric motor 601 comprises an A-side 603, which comprises an output shaft, and a B-side 605 opposite the A-side. The arrangement shown in FIG. 4 is arranged on the B-side; that is to say, at the B-side 605 of the electric motor 601. In this case, the frame 101 is thermally connected or coupled to the electric motor 601.

A housing 607 is arranged or placed onto the metal sheet 401, wherein further electronics of a converter may be arranged, and according to one embodiment are actually arranged, in the housing 607. The plastic frame 301 forms a thermal isolation between the frame 101, which is thermally coupled to the electric motor 601, and the housing 607 for the further electronics. That is to say, therefore, that the housing 607 and the frame 101 are thermally decoupled from one another. This affords the technical advantage, in particular that the housing 607 is also thermally decoupled from the electric motor 601. Consequently, during the operation of the electric motor 601 an interior of the housing 607 thus does not become as hot as an interior in the frame 101. As a result, advantageously, a receiving area is formed in which electronic components, for example electronic components of converter electronics, can be arranged, wherein said components then need not be specified for the same temperature as the components, here the power transistors 201, of the frame 101.

Consequently, the frame 101 forms a first receiving area. The housing 607 forms a second receiving area. The two receiving areas are thermally decoupled from one another. This is done by means of the plastic frame 301 or using a similar frame member or structure. During the operation of the electric motor 601, therefore, a first temperature zone 609 will form in the frame 101 and a second temperature zone 613 will form in the housing 607. The two temperature zones 609, 613 are different. That is to say that a lower temperature will prevail in the housing 607 compared with the temperature in the frame 101. By way of example, a temperature in the first temperature zone 609 is between 90° C. and 100° C. On account of the thermal isolation, a temperature in the housing 607, that is to say in the second temperature zone 613, is 70° C. to 80° C., for example.

By way of example, electronics for the coupling of the encoder 501 are arranged in the housing 607.

As an alternative to the encoder 501, according to an embodiment it is provided that a resolver for detecting the position of a motor shaft (not illustrated in detail here) of the electric motor 601 is provided.

The arrangement shown in FIG. 6 is identified in its entirety by the reference sign 615 and forms a drive device.

Embodiments of the invention may thus comprise, in particular, the concept of flanging a converter onto a electric motor on the B-side, wherein a formation of a "hot" side (first temperature zone 609) and a "cold" side (second temperature zone 613) is possible in a very compact manner by means of a temperature shielding (plastic frame), or using a similar temperature shield or plastic frame member or structure.

By virtue of the fact that the metal sheet 401 with the tube 403 is placed on the plastic frame 301 and the tube 403 projects into the frame 101, the metal sheet 401 is also thermally decoupled from the frame 101 and from the electric motor 601. The second temperature zone 613 in the housing 607 is thus advantageously lengthened into the frame 101. That is to say, therefore, that in the frame 101 itself a space is formed in which a lower temperature will prevail during the operation of the electric motor 601 compared with the temperature outside this space, that is to say outside the tube 403. In this case, the tube 403 acts as a heat shield against heat radiation resulting from the waste heat of the electric motor 601 during operation.

Figure 7:
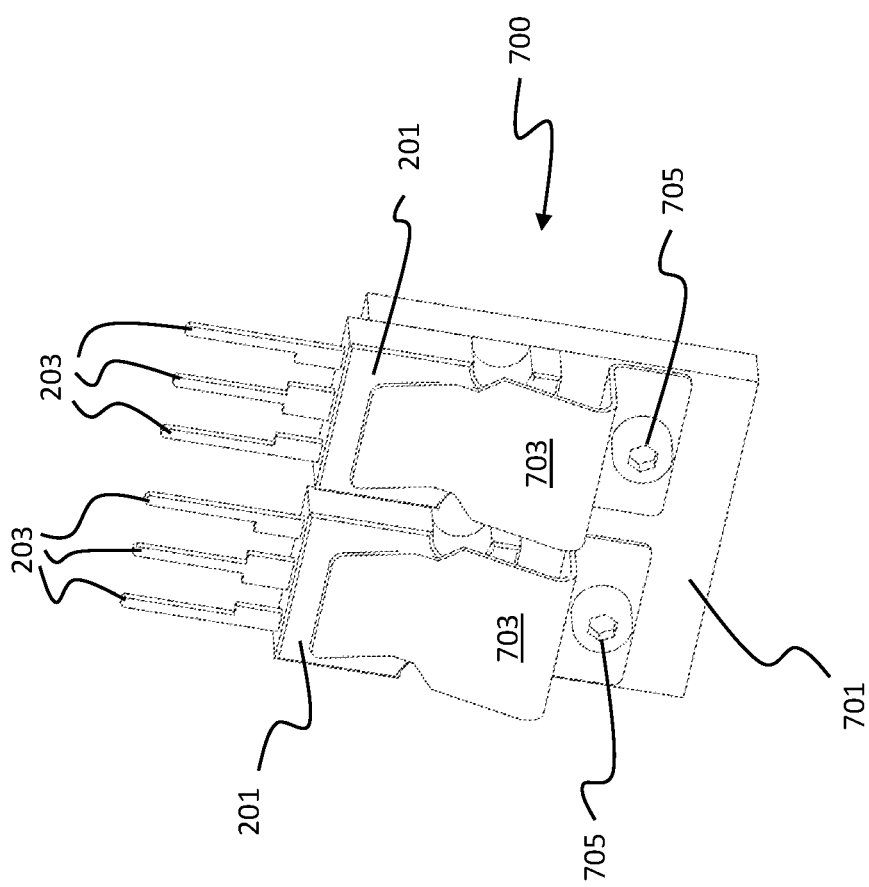
FIG. 7 shows a fixing unit with power transistors.

FIG. 7 shows a fixing unit 700 for power transistors 201. The fixing unit 700 comprises a plate 701, on which two spring clamps 703 are screwed by means of a respective screw 705 or using a similar member. A respective power transistor 201 is fixedly clamped in the spring clamps 703.

Further advantages of this fixing unit 700 shown in FIG. 7 are for example:

A simple exchangeability and, on account of the spring force, a good thermal linking of the power transistors 201 to the plates 701.

In an embodiment, the plate 701 is also formed by the frame 101 in accordance with FIGS. 1-6. That is to say that the frame 101 comprises spring clamps 703 in which the power transistors 201 may be or are fixedly clamped.

Figure 8:
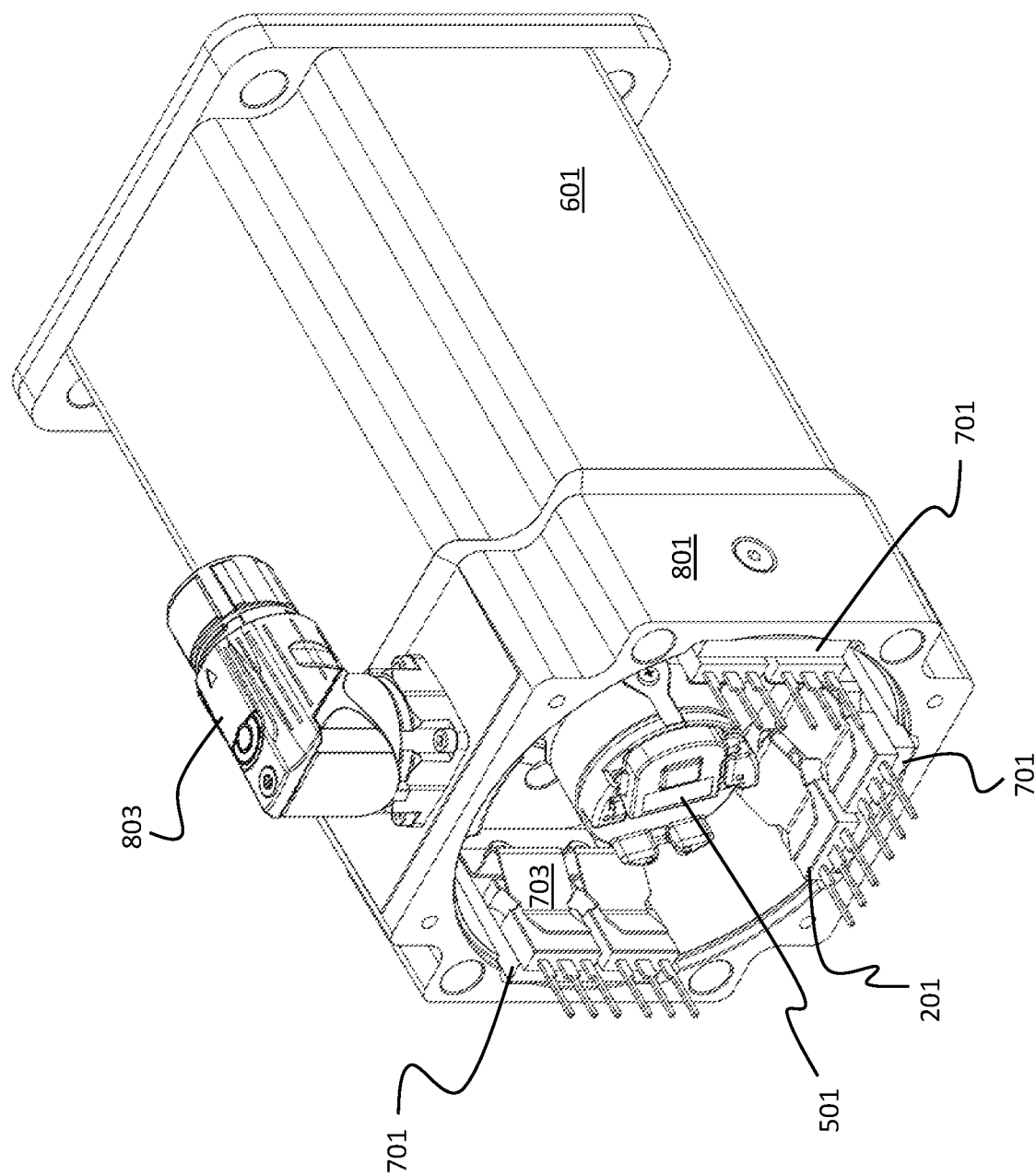
FIG. 8 shows a first receiving area with power transistors.

FIG. 8 shows a fixing unit 700 analogous to the arrangement in accordance with FIG. 7. This time, however, the fixing unit 700 comprises three plates 701 in accordance with the arrangement in FIG. 7. These three plates 701 with in each case two fixedly clamped power transistors 201 are arranged on an outer edge of an outer side of a bearing shield 801 of an electric motor, for example the electric motor 601. In such a configuration, the frame 101 is dispensed with. The bearing shield 801 itself forms the first receiving area for the power transistors 201. Notwithstanding this, in the configuration in accordance with FIG. 8 as well it is provided that, analogously to FIGS. 3 to 6, a plastic frame 301 is arranged on the bearing shield 801, wherein a metal sheet 401 with a flanged tube 403 is then placed onto the plastic frame 301, and then the housing 607 thereon.

The reference sign 803 denotes a plug that is arranged on the bearing shield 801 and serves for the electrical contact with the drive device 601.

FIGS. 9 to 13 show, analogously to FIGS. 1 to 5, in each case a point in time during assembly of a drive device. The lower drawing in FIGS. 9 to 13 shows a plan view. The upper drawing in FIGS. 9 to 13 shows a sectional side view along a broken line B-B' in accordance with the plan view.

Figure 9:
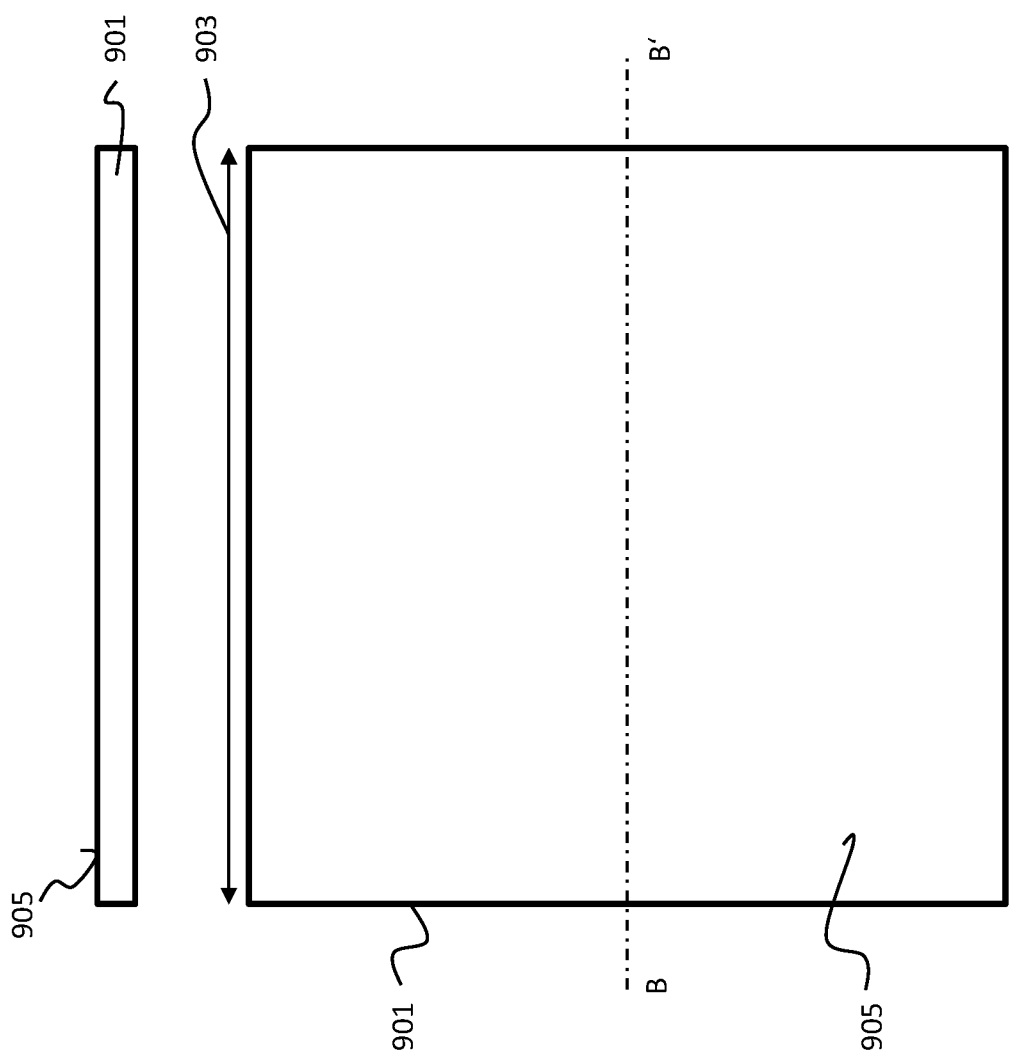
FIGS. 9-13 show in each case a point in time during assembly of a drive device.
Figure 10:
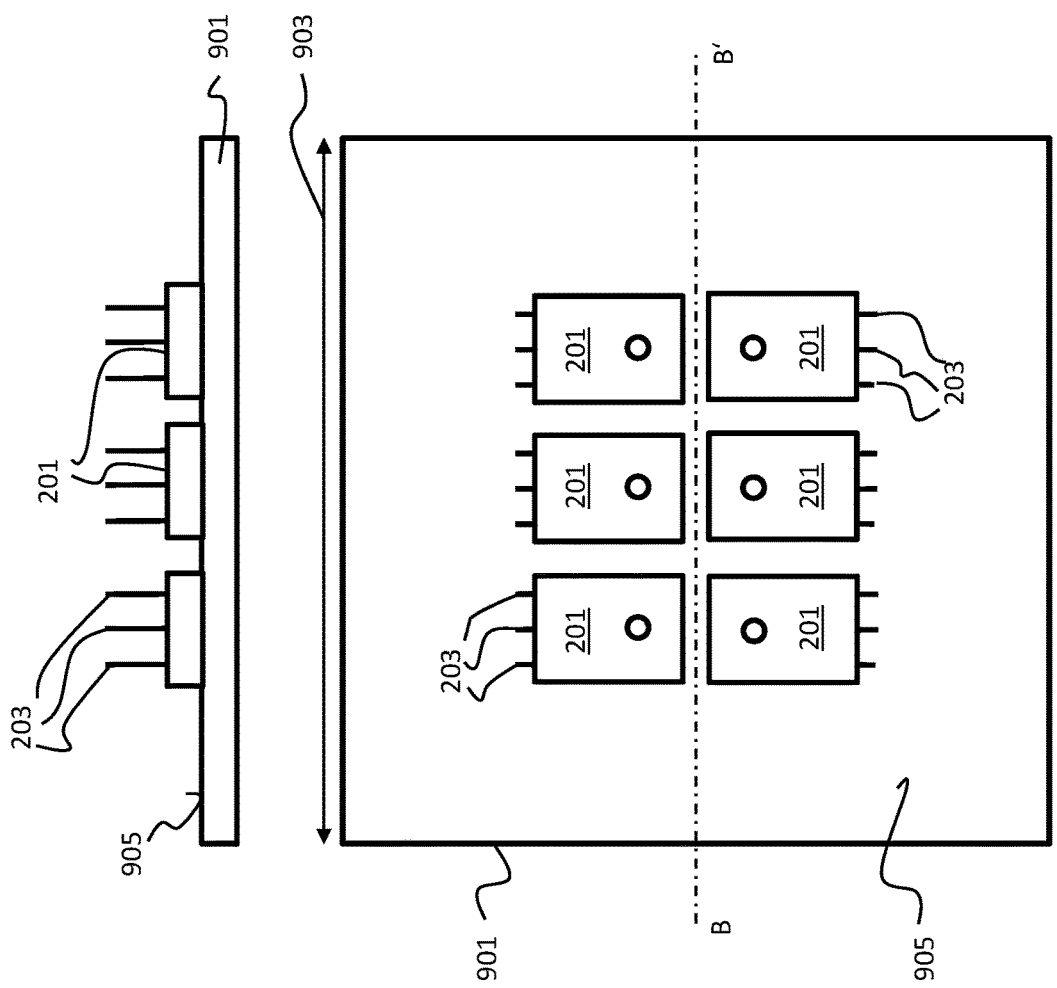

FIG. 9 shows a baseplate 901, which is formed from aluminum, for example. As shown in FIG. 10, six power transistors 201 are mounted on a mounting face 905 of the baseplate 901. The reference sign 903 denotes a double-headed arrow that symbolically illustrates a width of the baseplate 901. The width is 100 mm, for example. The baseplate 901 is formed in a quadrilateral fashion, and for example in a square fashion. By way of example, the baseplate 901 is used instead of a B-side cover of the electric motor 601.

As already explained, FIG. 10 shows the baseplate 901 having six power transistors 201 arranged on the mounting face 905. The power transistors 201 are silicon carbide MOSFETs, for example. In contrast to the power transistors 201 shown in FIGS. 1-5, the power transistors 201 shown in FIGS. 9 to 14 comprise angular connection pins 203.

Figure 11:
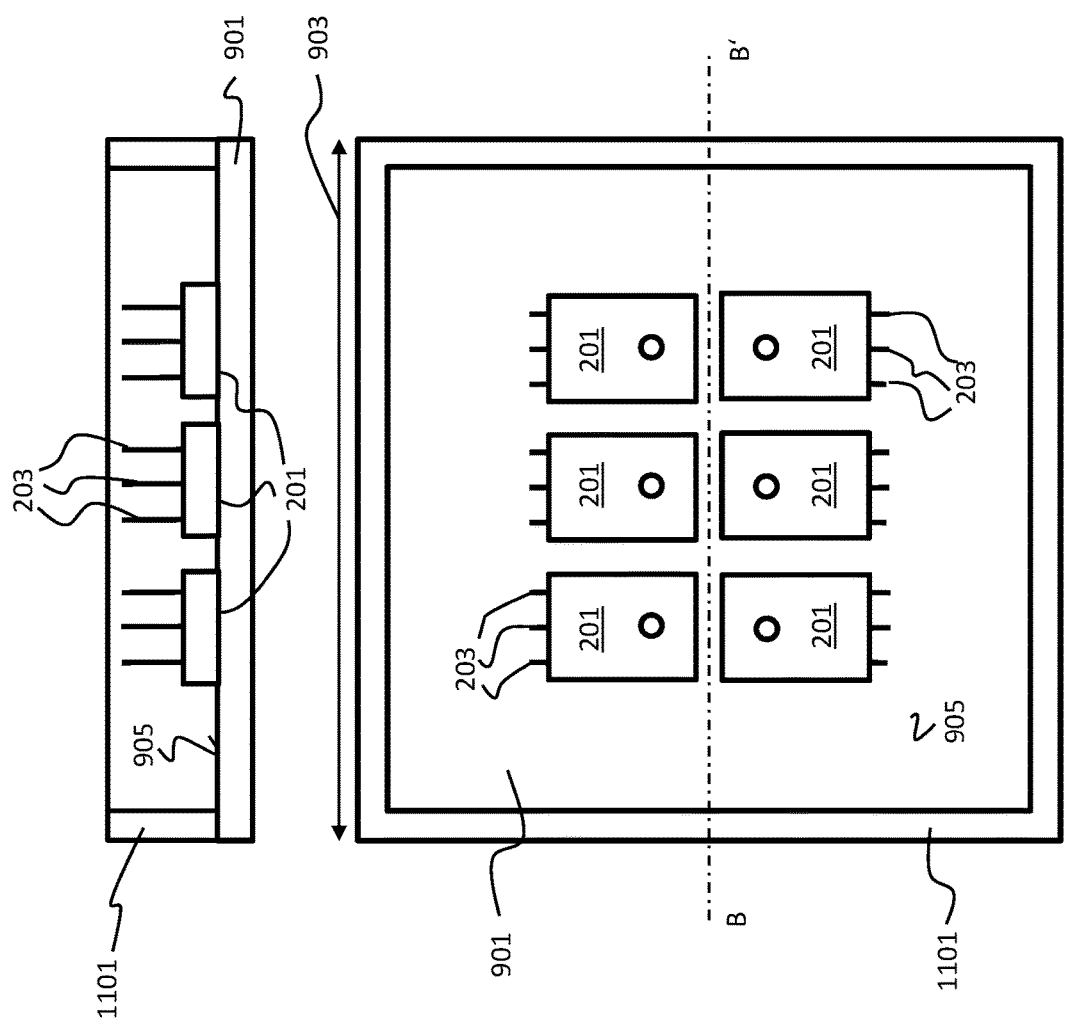

FIG. 11 shows the arrangement in accordance with FIG. 10, wherein a frame 1101, which is formed from aluminum, for example, is placed or arranged on the mounting face 905. In this case, the contour or the dimensioning of the frame 1101 is such that it corresponds to the contour or the geometry of the baseplate 901. That is to say, therefore, that the frame 1101 terminates flush with outer edges of the baseplate 901. The frame 1101 advantageously acts as a heat sink, such that a cooling of the power transistors 201 is effected thereby.

Figure 12:
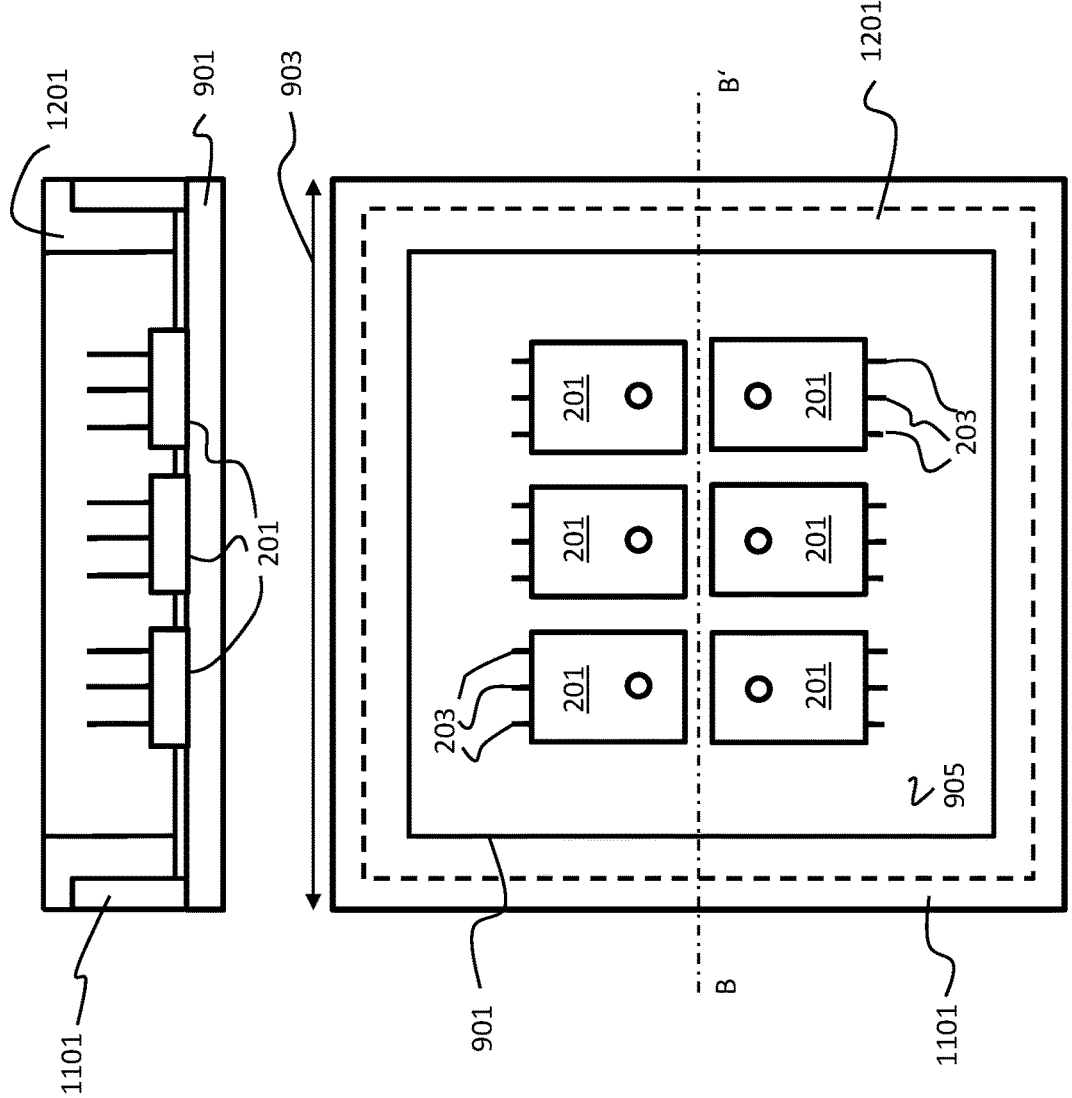

FIG. 12 shows the arrangement in accordance with FIG. 11, wherein a plastic frame 1201 is provided, which is placed or arranged on the frame 1101. Said plastic frame 1201 acts as a thermal isolation. This is because the baseplate 901 with its mounting face 905 forms a first receiving area for converter power electronics, here the power transistors 201. Said first receiving area is thermally decoupled from a second receiving area, illustrated and explained in even greater detail below, by means of the plastic frame 1201.

Figure 13:
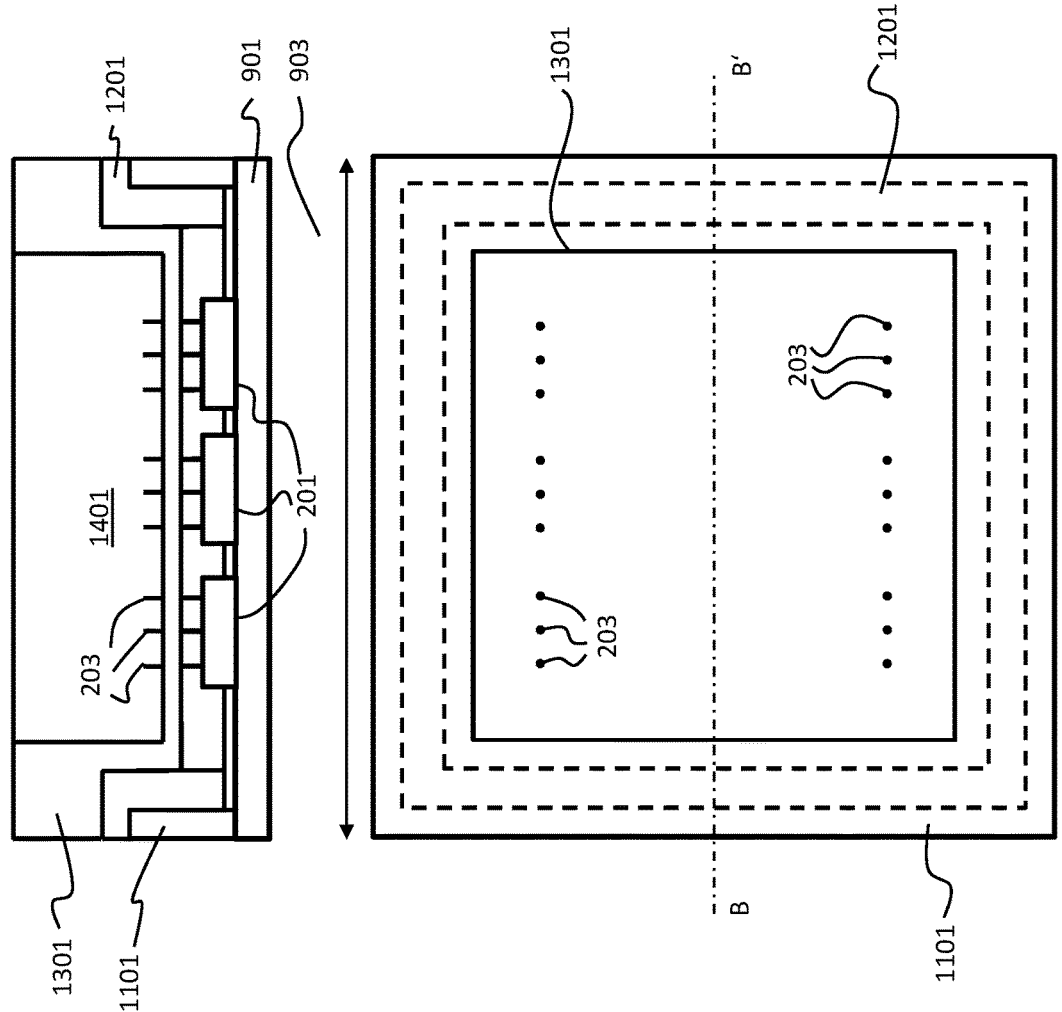

FIG. 13 shows the arrangement in accordance with FIG. 12, wherein a further frame 1301, which is formed from aluminum, for example, is placed or arranged on the plastic frame 1201. Here, too, the further frame 1301 terminates flush with outer edges of the baseplate 901 and of the plastic frame 1201.

In the further frame 1301, which thus forms a second receiving area, for example further electronic components of converter electronics may be received, which is actually provided according to one embodiment. On account of the plastic frame 1201, the further frame 1301 and the baseplate 901 with the placed frame 1101 are thermally decoupled from one another. That is to say, therefore, that in the case of a thermal coupling of the baseplate 901, which is provided in this way according to one embodiment, on the B-side of the electric motor 601, the further frame 1301 is also thermally decoupled from the electric motor 601.

Figure 14:
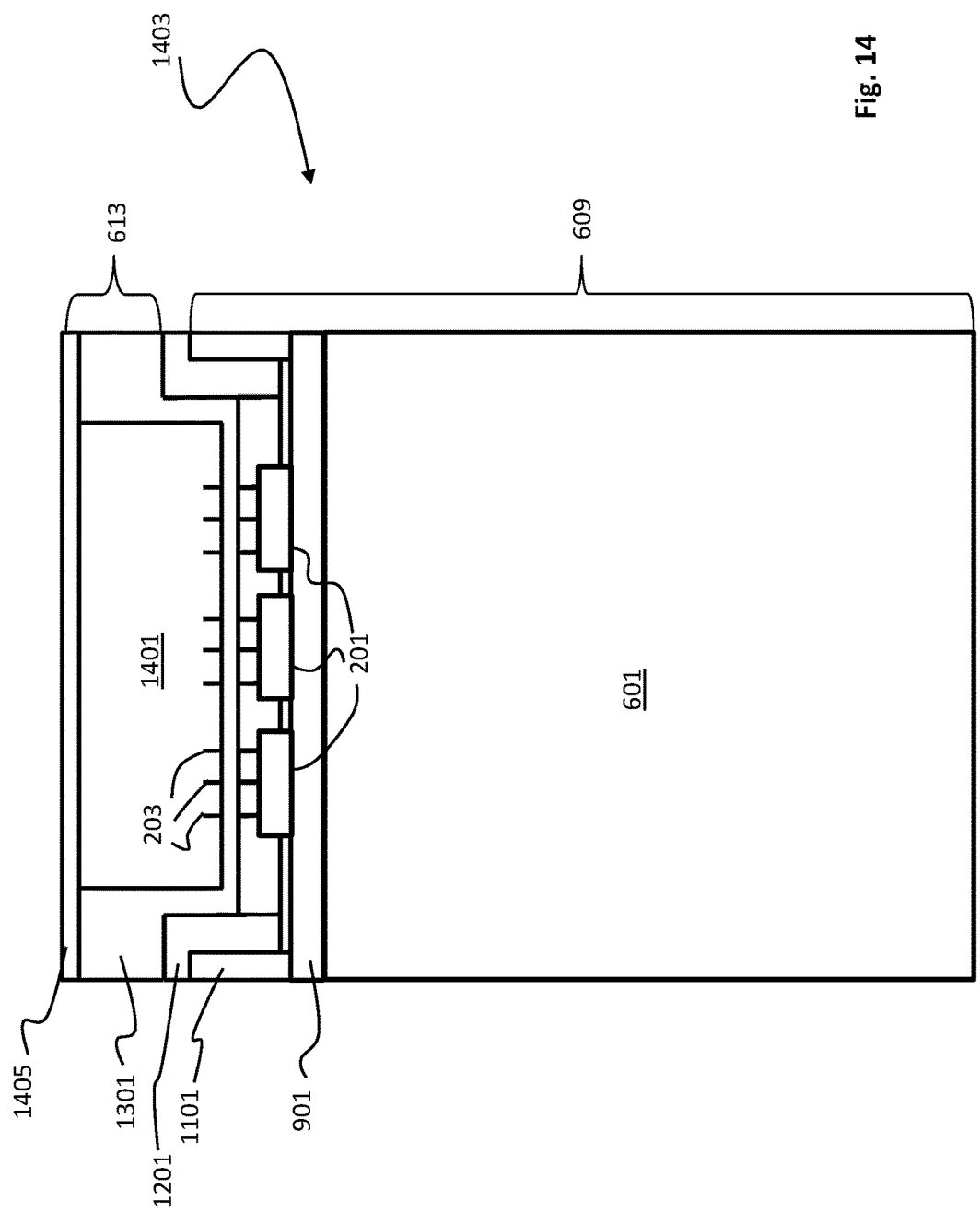
FIG. 14 shows a drive device.

FIG. 14 shows the arrangement in accordance with FIG. 13 with the electric motor 601 flanged or arranged on the baseplate 901.

Analogously to the component 615 in accordance with FIG. 6, therefore, a first temperature zone 609 and a second temperature zone 613 correspondingly form in the first and second receiving area, respectively.

By way of example, control electronics 1401 of the converter are arranged in the further frame 1301, wherein the further frame 1301 is closeable by means of a housing cover 1405 or using a similar housing structure or member.

The division of the heights of the frames 1101 and 1301 is dependent for example on the powers of the power transistors 201 and the control electronics 1401. One optimization criterion is for example a maximum torque (which corresponds to a maximum current) when complying with the temperature specifications of the individual electronic components.

Instead of the six power transistors 201, according to an alternative embodiment, a six pack module may also be used, in which six transistors are accommodated or arranged in a housing by the semiconductor manufacturer. According to one embodiment, the drive device is used for a drive of one or more robots. In particular, the drive device is used in an automation system.

It is generally the case that known industrial electric motors use converters having insulated gate bipolar transistors (IGBTs), wherein the converters are usually mounted like a "rucksack" laterally on the motor. The heat sinks required therefor appreciably increase the dimensions and the weight of such a drive. Furthermore, the known drives generally cannot be operated with the full current because otherwise the electronics become too hot. It is customary here for such drives to have only approximately 60% to 80% of the rated power compared with motors without fitted converters. That is referred to as derating among those skilled in the art.

On account of the thermal isolation according to embodiments of the invention and the resultant thermal decoupling of the first receiving area and of the second receiving area, a drive device can be provided which makes possible an electric motor, which can be configured for example as a servomotor, with a fitted converter without derating in a particularly compact fashion and without a fan.

According to embodiments of the invention, according to one embodiment it is provided that silicon carbide MOSFETs are used instead of the silicon IGBTs. Silicon carbide MOSFETs are distinguished by very low losses and a particularly high thermal stability (up to 200° C.). In this case, the converter, which may also be designated as an add-on converter, is divided into two temperature zones: the first receiving area and the second receiving area. The silicon carbide MOSFETs are thermally coupled to the motor housing which may be formed from aluminum, for example. The other electronics are thermally decoupled therefrom by means of the thermal isolator or using a similar thermally isolating structure or member, and cooled for example by means of a metal cap or using a similar member, for example the housing 607. According to one embodiment, optionally the resolver or in particular the encoder may also be connected to this cooler zone, that is to say the second temperature zone. This is done for example by means of or in dependence on the lengthening of the second temperature zone on the basis of the tube 403 of the metal sheet 401.

Embodiments of the invention thus makes it possible to construct particularly compact and energy-efficient motor add-on converters with which the rated power of the motor does not need to be reduced or needs hardly to be reduced (no derating).

This invention has been described with respect to exemplary embodiments. It is understood that changes can be made and equivalents can be substituted to adapt these disclosures to different materials and situations, while remaining with the scope of the invention. The invention is thus not limited to the particular examples that are disclosed, but encompasses all the embodiments that fall within the scope of the claims.

What is claimed is:

1. A drive device, comprising:
   an electric motor, and
   a first receiving area and a second receiving area formed on a B-side of the electric motor, the first and second receiving areas being thermally two receiving areas decoupled from one another by a thermal isolation, such that during the operation of the electric motor a first temperature zone can be formed in the first receiving area and a second temperature zone can be formed in the second receiving area,
   wherein a heat shield having a section projecting into the first receiving area is formed, the heat shield being thermally coupled to the second receiving area, such that the second temperature zone can be lengthened into the first receiving area.

2. The drive device according to claim 1, wherein a fixing unit for power transistors of a converter power electronics is arranged releasably in the first receiving area, the fixing unit comprising at least one plate with at least one spring clamp fixed on the plate and serving for fixedly clamping a power transistor.

3. The drive device according to claim 1, wherein the first receiving area is formed by a bearing shield of the electric motor.

4. The drive device according to claim 1, wherein the first receiving area is thermally coupled to the electric motor.

5. The drive device according to claim 1, wherein the first receiving area comprises a self-contained frame.

6. The drive device according to claim 5, wherein the first receiving area comprises a baseplate, on which the frame is arranged as heat sink.

7. The drive device according to claim 5, wherein the isolation comprises a self-contained plastic frame, which is fixed to the frame in any of a force-locking and positively locking manner.

8. A drive device, comprising:
   an electric motor,
   a first receiving area and a second receiving area, the first and second receiving areas being formed on a B-side of the electric motor, the first and second receiving areas being thermally decoupled from one another by a thermal isolation, such that during the operation of the electric motor a first temperature zone can be formed in the first receiving area and a second temperature zone can be formed in the second receiving area, and
   wherein a heat shield having a section projecting into the first receiving area is formed, the heat shield being thermally decoupled from the first receiving area by the thermal isolation and the projecting section comprising a third receiving area for a position sensor.

9. The drive device according to claim 8, wherein the first receiving area is formed by a bearing shield of the electric motor.

10. The drive device according to claim 8, wherein the heat shield is thermally coupled to the second receiving area, such that the second temperature zone can be lengthened into the first receiving area.

11. The drive device according to claim 8, wherein the heat shield comprises a metal sheet having a flanged tube as projecting section.

12. The drive device according to claim 8, wherein the first receiving area is thermally coupled to the electric motor.

13. The drive device according to claim 8, wherein the first receiving area comprises a self-contained frame.

14. The drive device according to claim 13, wherein the first receiving area comprises a baseplate, on which the frame is arranged as heat sink.

15. The drive device according to claim 13, wherein the isolation comprises a self-contained plastic frame, which is fixed to the frame in a force-locking and/or positively locking manner.

16. The drive device according to claim 8, wherein a fixing unit for power transistors of a converter power electronics is arranged releasably in the first receiving area.

17. The drive device according to claim 16, wherein the fixing unit comprises at least one plate with at least one spring clamp fixed on the plate and serving for fixedly clamping a power transistor.

18. The drive device according to claim 8, wherein SiC MOSFETs are arranged as converter power electronics in the first receiving area.

* * * * *